United States Patent
Yeh

(10) Patent No.: US 9,425,697 B2
(45) Date of Patent: Aug. 23, 2016

(54) POWER SUPPLY AND METHOD FOR COMPENSATING LOW-FREQUENCY OUTPUT VOLTAGE RIPPLE THEREOF

(71) Applicant: ACBEL POLYTECH INC., New Taipei (TW)

(72) Inventor: Chia-An Yeh, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 134 days.

(21) Appl. No.: 14/567,790

(22) Filed: Dec. 11, 2014

(65) Prior Publication Data
US 2016/0079868 A1    Mar. 17, 2016

(30) Foreign Application Priority Data
Sep. 11, 2014  (TW) .............................. 103131279 A

(51) Int. Cl.
| | |
|---|---|
| H02M 1/42 | (2007.01) |
| H02M 3/157 | (2006.01) |
| H02M 3/335 | (2006.01) |
| H02M 1/14 | (2006.01) |
| H02M 1/00 | (2006.01) |

(52) U.S. Cl.
CPC ............ *H02M 3/33538* (2013.01); *H02M 1/14* (2013.01); *H02M 1/4225* (2013.01); *H02M 3/157* (2013.01); *H02M 2001/007* (2013.01)

(58) Field of Classification Search
None
See application file for complete search history.

(56) References Cited

U.S. PATENT DOCUMENTS

| | | | | |
|---|---|---|---|---|
| 8,120,347 | B1 * | 2/2012 | Cao ...................... | H02M 1/4225 323/222 |
| 2004/0047166 | A1 * | 3/2004 | Lopez-Santillana | H02M 1/4225 363/89 |
| 2006/0214603 | A1 * | 9/2006 | Oh ...................... | H05B 33/0815 315/246 |
| 2010/0054001 | A1 * | 3/2010 | Dyer .................... | H02M 1/4225 363/21.17 |
| 2014/0327411 | A1 * | 11/2014 | Gumaer .................. | H02M 1/42 323/208 |
| 2015/0062985 | A1 * | 3/2015 | Colbeck .................. | H02M 1/42 363/89 |

* cited by examiner

*Primary Examiner* — Jeffrey Gblende
(74) *Attorney, Agent, or Firm* — Pai Patent & Trademark Law Firm; Chao-Chang David Pai

(57) ABSTRACT

A power supply has a power factor correction (PFC) circuit and a DC to DC conversion circuit. A DC to DC controller of the DC to DC conversion circuit acquires zero-crossing information and load information from the PFC circuit through a communication protocol, and performs a low-frequency compensation on a control command using a table-mapping means, thereby resolving the issues of higher controller complexity, changes of entire response characteristics and cost increase in conventional compensation technique.

18 Claims, 8 Drawing Sheets

POWER SUPPLY AND METHOD FOR COMPENSATING LOW-FREQUENCY OUTPUT VOLTAGE RIPPLE THEREOF

BACKGROUND OF THE INVENTION

1. Field of the Invention

The present invention relates to a power supply and a method for compensating low-frequency output voltage ripple and, more particularly, to a technique pertinent to control command compensation performed by providing zero-crossing information of AC (Alternating Current) power of a power factor correction (PFC) circuit on a primary side of a power supply and load information to a DC (Direct Current) to DC conversion circuit for the DC to DC conversion circuit to compensate control command thereof in collaboration with a table-mapping means.

2. Description of the Related Art

With reference to FIG. 6, a conventional switching power supply has a rectification circuit 81, a PFC circuit 82 and a DC to DC conversion circuit 83. The rectification circuit 81 converts an AC input power (AC in) into a DC power. The PFC circuit 82 is connected to an output terminal of the rectification circuit 81, and has an inductor L1, a diode, a first power switch S1 and a PFC controller located on a DC circuit loop. The PFC controller is connected to and detects the AC input power (AC in). The DC to DC conversion circuit 83 has a transformer T1, a DC to DC controller U1 and a second power switch S2. One control terminal of the DC to DC controller U1 is connected to the second power switch S2. The second power switch S2 is connected to the primary side of the transformer T1.

The DC to DC conversion circuit 83 acquires an input voltage Vin(t) from an output terminal of the PFC circuit 82, and further generates an output voltage Vout(t) after conversion. The input voltage Vin(t) is converted from the AC input power (AC in) at a specific frequency (e.g. 60 Hz) and thus contains low-frequency ripple at a frequency doubling the specific frequency (e.g. 120 Hz) as shown in FIG. 7A. The low-frequency ripple still exists in the output voltage Vout(t) as shown in FIG. 7B even after the conversion of the DC to DC conversion circuit 83. However, the low-frequency ripple contained in the output voltage Vout(t) should be removed or reduced as much as possible.

A first approach of eliminating low-frequency ripple in the output voltage Vout(t) is to increase the low-frequency response speed of the DC to DC conversion circuit 83. As such approach involves higher complexity of the DC to DC controller U1 and measurement of input voltage and may affect other low-frequency response characteristics, directly increasing the low-frequency response speed of the DC to DC conversion circuit 83 is not an ideal solution.

With reference to FIG. 8, a second approach targets at adding a ripple suppression circuit 84 between a DC input voltage terminal and the DC to DC controller U1. The ripple suppression circuit 84 has a high-pass filter 841 and an adder 842. After passing the high-pass filtering, the input voltage Vin(t) is added to a reference signal by the adder 842 to compensate control commands of the DC to DC controller U1 and thereby eliminating the low-frequency ripple contained in the output voltage Vout(t).

Although the second approach can eliminate low-frequency ripple in the output voltage Vout(t), the input voltage Vin(t) is a high-voltage DC power and the ripple suppression circuit 84 also involves a high-voltage circuit loop, which makes the circuit design more complicated and inevitably increases the production cost. A third approach, which is similar to the second approach, adopts a resonant controller to replace the foregoing ripple suppression circuit 84. However, the third approach also has the issues of higher circuit complexity and cost.

SUMMARY OF THE INVENTION

An objective of the present invention is to provide a power supply and a method for compensating low-frequency output voltage ripple of the power supply, which use a DC to DC conversion circuit to acquire zero-crossing information of an AC input power and load information from a PFC circuit through a communication protocol and to perform compensation with a table-mapping means, effectively eliminating low-frequency ripple and simplifying the circuit structure at the absence of the issues of change of response characteristics and cost increase.

To achieve the foregoing objective, given a power supply having a power factor correction (PFC) circuit and a DC (Direct Current) to DC conversion circuit with the DC to DC conversion circuit having a DC to DC controller, the method for compensating low-frequency output voltage ripple of a power supply is performed by the DC to DC controller and has steps of:

providing a mapping table with multiple compensation signals built in the DC to DC controller;

continuously acquiring zero-crossing information of an AC (Alternating Current) power from the PFC circuit;

determining if a zero-crossing of the AC input power is taking place according to the zero-crossing information; and selecting a corresponding compensation signal from the mapping table to compensate a control command when the zero-crossing of the AC input power is taking place.

To achieve the foregoing objective, the power supply has a power factor correction (PFC) circuit and a DC (Direct Current) to DC conversion circuit.

The PFC circuit has a PFC controller connected to an AC (Alternating Current) power to detect and provide zero-crossing information of the AC input power.

The DC to DC conversion circuit has a DC to DC controller connected to the PFC controller through a communication protocol to acquire the zero-crossing information of the AC input power. The DC to DC controller has a control unit built in with a mapping table with multiple compensation signals. The control unit locates one of the compensation signals from the mapping table to compensate an original control command according to the acquired zero-crossing information of the AC input power.

The present invention employs the function of the PFC circuit of the power supply in detecting the AC input power and the load to provide the DC to DC conversion circuit the zero-crossing information of the AC input power, such that the DC to DC conversion circuit identifies a corresponding compensation signal from the mapping table to compensate the control command upon a zero-crossing of the AC input power to thus effectively eliminate the low-frequency ripple existing in the output voltage. As the compensation technique of the present invention involves no adjustment of the speed of low-frequency response, other low-frequency response characteristics will not be affected. Moreover, because the DC to DC controller of the DC to DC conversion circuit acquires the zero-crossing information of the AC input power and compensates the original control command with the table-mapping means, no additional hardware circuit is required and circuit complexity and cost increase can be avoided accordingly.

DETAILED DESCRIPTION OF THE INVENTION

Figure 1:
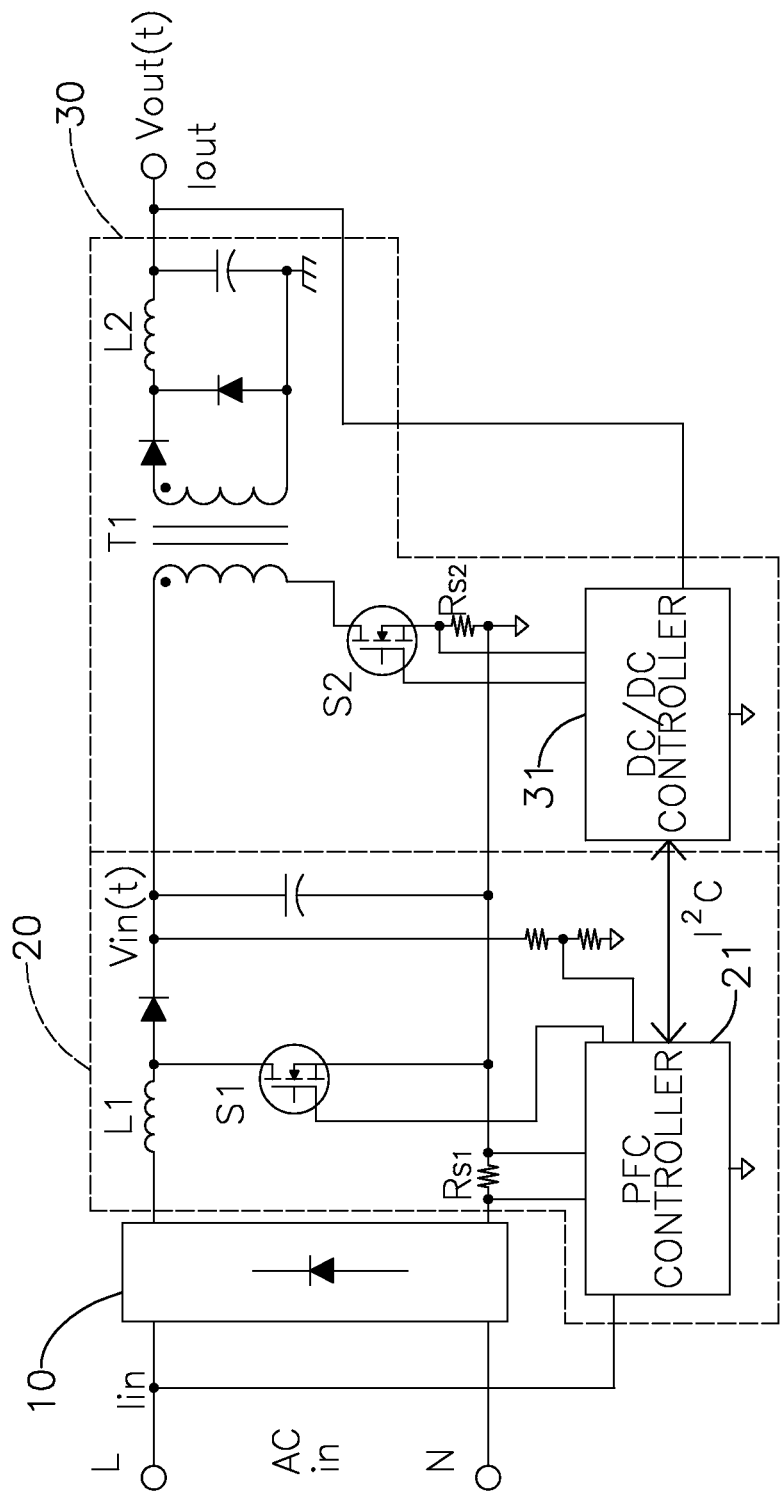
FIG. 1 is a circuit diagram of a power supply in accordance with the present invention.

With reference to FIG. 1, a power supply in accordance with the present invention has a rectification circuit 10, a power factor correction (PFC) circuit 20 and a DC to DC conversion circuit 30.

The rectification circuit 10 has an AC (Alternating Current) input terminal and a DC (Direct Current) output terminal. The AC input terminal is connected to an AC input power (AC in) to convert the AC input power (AC in) into a DC power. The PFC circuit 20 is connected between the DC output terminal of the rectification circuit 10 and a DC voltage input terminal of the DC to DC conversion circuit 30.

The PFC circuit 20 includes an inductor L1, a diode, a first power switch S1 and a PFC controller 21. The PFC controller 21 is connected to the AC input power (AC in) to detect zero-crossing information of the AC input power (AC in) and load information of the power supply, such as input current Iin and output current Iout of the DC to DC conversion circuit 30.

The DC to DC conversion circuit 30 has a transformer T1, a DC to DC controller U1 and a second power switch S2. The primary side of the transformer T1 is connected to the second power switch S2 and an output terminal of the PFC circuit 20. A control terminal of the DC to DC controller 31 is connected to the second power switch S2.

The DC to DC controller 31 and the PFC controller 21 of the DC to DC conversion circuit 30 are connected through a communication protocol for the DC to DC controller 31 to acquire the zero-crossing information of the AC input power (AC in) from the PFC controller 21. In the present embodiment, with further reference to FIG. 1, the communication protocol is I²C (Inter-integrated Circuit). The DC to DC controller 31 acquires the zero-crossing information of the AC input power (AC in) from the PFC controller 21.

Figure 2:
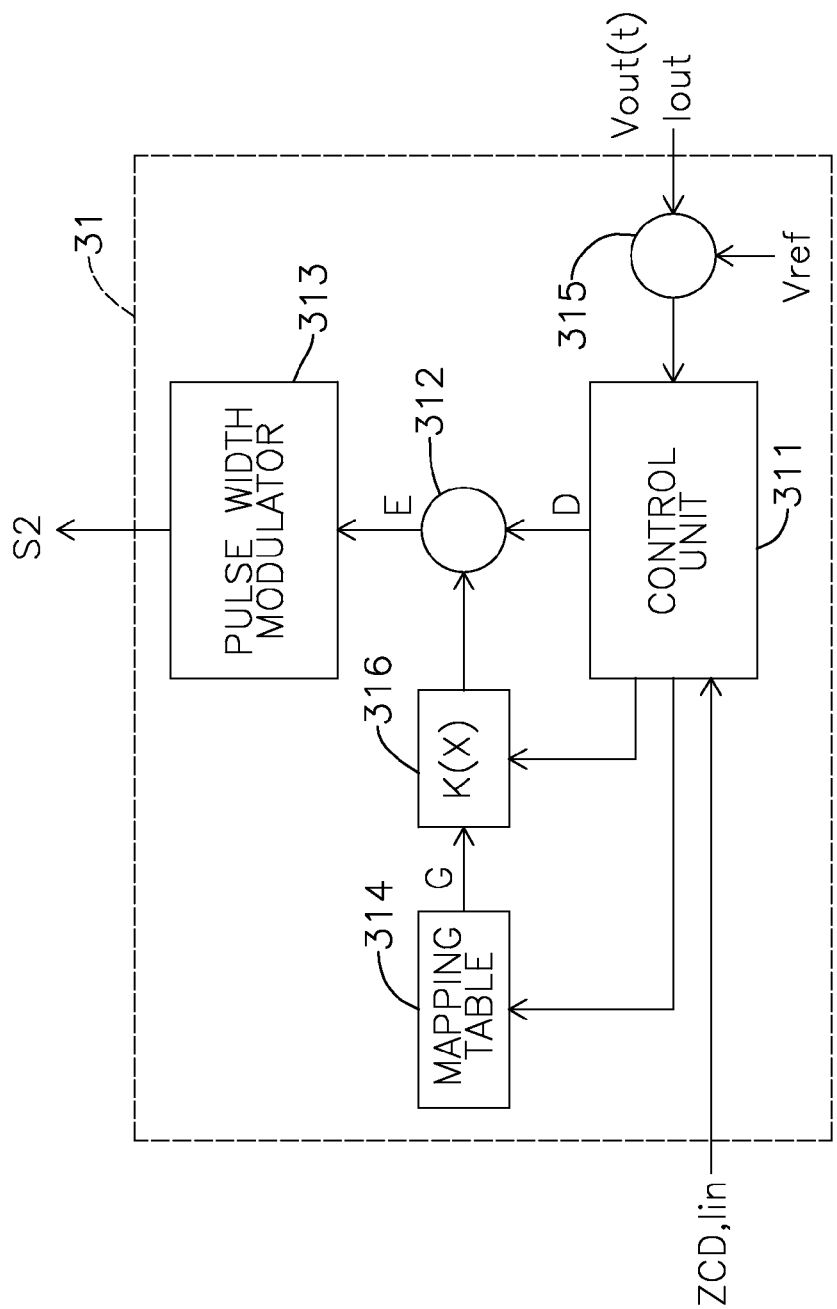
FIG. 2 is a functional circuit diagram of a PFC controller in FIG. 1.

With reference to FIG. 2, the DC to DC controller 31 is a PWM (Pulse Width Modulation) controller and has a control unit 311, a first adder 312, a pulse width modulator 313 and a mapping table 314. The mapping table 314 is built in with multiple compensation signals. In the present embodiment, each compensation signal is a part of a sinusoidal signal. The first adder 312 is connected between a control command output terminal of the control unit 311 and an input terminal of the pulse width modulator 313. The control unit 311 locates a corresponding compensation signal from the mapping table 314 according to the zero-crossing information and the load information acquired from the PFC controller 21 to compensate a control command of the control unit 311 originally outputted to the pulse width modulator 313. The pulse width modulator 313 further drives the second power switch S2 according to the compensated control command to eliminate the low-frequency ripple contained in an output voltage Vout(t) of the DC to DC conversion circuit 30.

In the present embodiment, the DC to DC controller 31 further has a second adder 315 adds a feedback of the output voltage Vout(t) and a reference voltage Vref and then sends the added signal to the control unit 311 as a reference for compensation.

Figure 3:
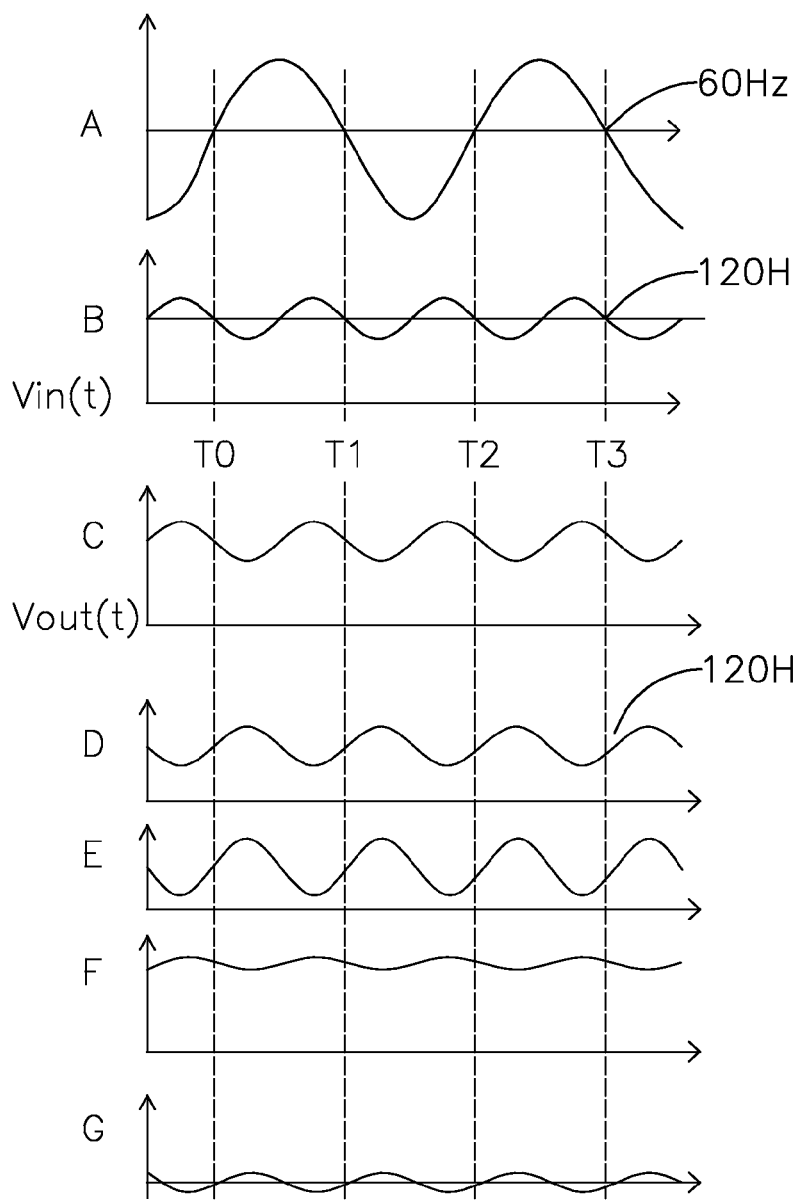
FIGS. 3A to 3G are waveform diagrams showing processes for compensating output voltage of a DC to DC conversion circuit of the power supply in FIG. 1.

With reference to FIGS. 3A to 3G, specific technical content about the compensation carried out for the control command is described as follows. A first waveform A indicates a sinusoidal signal of the AC input power (AC in). A frequency of the AC input power (AC in) at 60 Hz is given here to facilitate explanation. After the AC input power (AC in) is converted by the rectification circuit 10 and the PFC circuit 20, an input voltage Vin(t) as illustrated by a waveform B in FIG. 3B is provided to the DC to DC conversion circuit 30. The input voltage Vin(t) is converted by the DC to DC conversion circuit 30 in generation of the output voltage Vout(t) as illustrated by a waveform C in FIG. 3C. As can be seen from the waveforms B and C, both the input voltage Vin(t) and the output voltage Vout(t) contain low-frequency ripple with a ripple frequency at 120 Hz. The mentioned compensation mechanism targets at eliminating the low-frequency ripple with the ripple frequency at 120 Hz.

To ensure that the compensation mechanism is synchronous with the AC input power (AC in), the DC to DC controller 31 acquires the zero-crossing information of the AC input power (AC in) from the PFC controller 21. To ascertain timing for the compensation, the PFC controller 21 performs zero-crossing detection on the AC input power (AC in) when the sinusoidal signal of the AC input power (AC in) passes through a zero point (a zero crossing) from a negative half cycle to a positive half cycle or from a positive half cycle to a negative half cycle, and transmits the zero-crossing information to the DC to DC controller 31 through the communication protocol (I²C). After being informed that a zero-crossing is taking place in the AC input power (AC in), the DC to DC controller 31 locates a corresponding compensation signal from the mapping table 314 to compensate a control command. The compensation signal mapped from the mapping table 314 is illustrated as a waveform G in FIG. 3G. The control command is illustrated as a waveform D in FIG. 3D, and is a reverse signal of the input voltage Vin(t). The compensation signal mapped from the mapping table 314 and the control command have a same phase. After the first adder 312 adds the mapped compensation signal to the control command, the compensated control signal after the addition of the original control signal and the compensation is illustrated by a waveform E in FIG. 3E, and is of greater amplitude than that of the uncompensated control signal as shown in FIG. 3D. As the phases of the compensated control signal and the input voltage Vin(t) are reverse, after the pulse width modulator 313 drives the second power switch S2 according to the compensated control signal, the low-frequency ripple in the compensated output voltage Vout(t) as illustrated by a waveform F in FIG. 3F is significantly eliminated.

In the foregoing compensation mechanism the DC to DC controller 31 performs compensation at each zero-crossing point of the AC input power (AC in), and time axes in FIGS. 3D, 3E and 3G are used to explain compensation timing and content of the compensation signal.

When identifying a zero-crossing at time T0 of a sinusoidal signal of the AC input power (AC in) from the zero-crossing information, the DC to DC controller 31 locates a corresponding part of a sinusoidal wave as illustrated by a waveform G in FIG. 3G from the mapping table 314, which is superimposed on the control command (waveform D). The control command with the compensation signal superimposed thereon is illustrated by a portion of the waveform E between time T0 and time T1 in FIG. 3E.

When identifying a zero-crossing at time T1 of the sinusoidal signal of the AC input power (AC in) again from the zero-crossing information, the DC to DC controller 31 locates a corresponding part of a sinusoidal wave as illustrated by a waveform G in FIG. 3G from the mapping table 314, which is superimposed on the control command (waveform D). The compensated control command is illustrated by a portion of the waveform E between time T1 and time T2 in FIG. 3E. Similarly, when identifying a zero-crossing at time T2 of the sinusoidal signal of the AC input power (AC in) from the zero-crossing information, the compensated control command is illustrated by a portion of the waveform E between time T2 and time T3 in FIG. 3E. Such sequential compensation at each zero-crossing point of the sinusoidal signal of the AC input power (AC in) not only occurs synchronously with the sinusoidal signal of the AC input power but is accurately and effectively performed.

In addition to compensating the output voltage Vout(t) with the zero-crossing information in collaboration with the mapping table, the DC to DC controller 31 can also compensate the output voltage Vout(t) by referring to load information of the power supply, such that compensation of the output voltage Vout(t) can be performed according to a load variation. With further reference to FIG. 2, an adjuster 316 is connected between the mapping table 314 and the first adder 312 and is controlled by the control unit 311. The control unit 311 controls the adjustor 316 according to the load information to adjust a magnitude of the compensation signal selected from the mapping table 314 and superimposed on the control command. The load information includes the input current Iin acquired through the communication protocol I²C, the feedback output voltage Vout(t) obtained from the second adder 315 and the output current Vout for compensation taking the factor of load variation into account.

Figure 4:
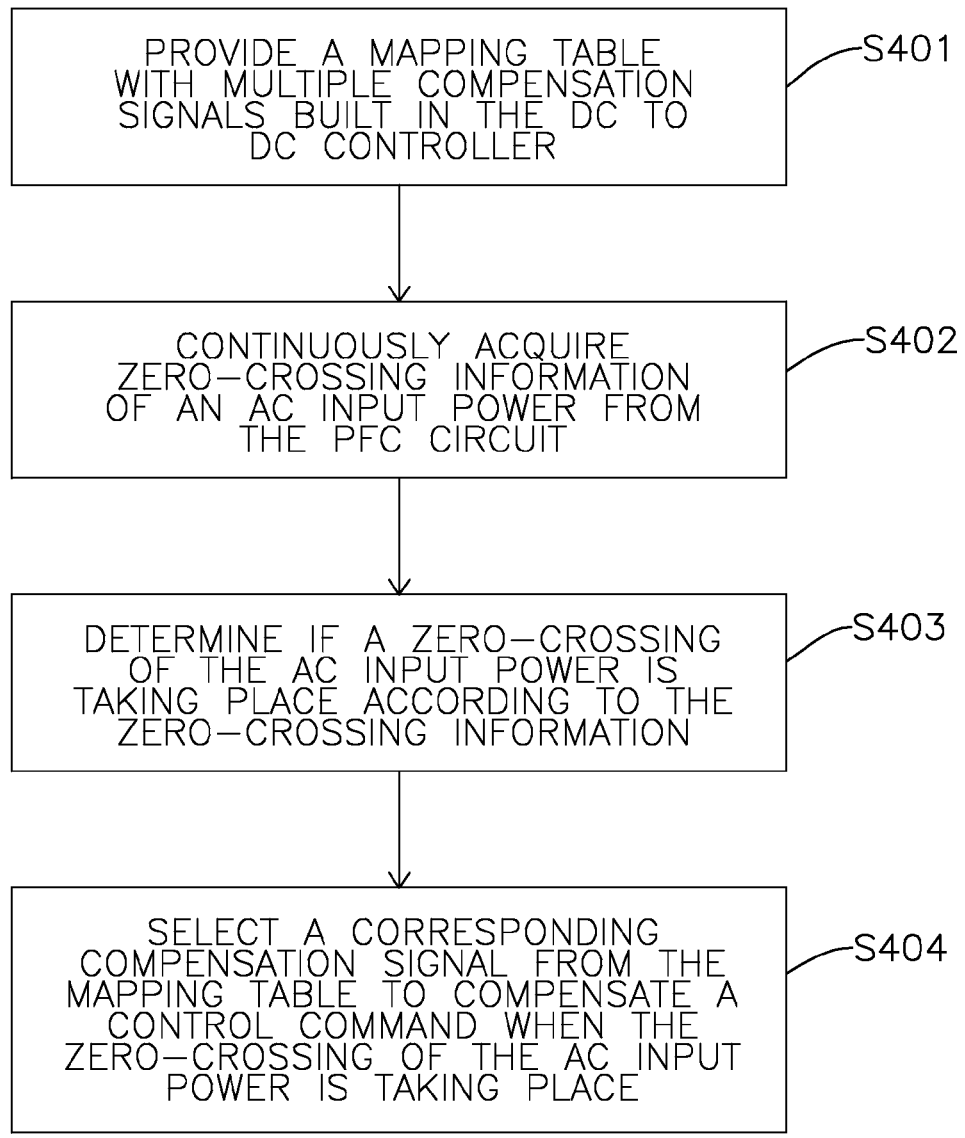
FIG. 4 is a flow diagram of a first embodiment of a method for compensating low-frequency output voltage ripple of the power supply in FIG. 1.

With reference to FIG. 4, a first embodiment of a method for compensating output voltage ripple of the foregoing power supply is performed by the DC to DC controller of the DC to DC conversion circuit, and has the following steps.

Step S401: Provide a mapping table with multiple compensation signals built in the DC to DC controller.

Step S402: Continuously acquire zero-crossing information of an AC (Alternating Current) input power from the PFC circuit.

Step S403: Determine if a zero-crossing of the AC input power is taking place according to the zero-crossing information.

Step S404: Select a corresponding compensation signal from the mapping table to compensate a control command when the zero-crossing of the AC input power is taking place.

Figure 5:
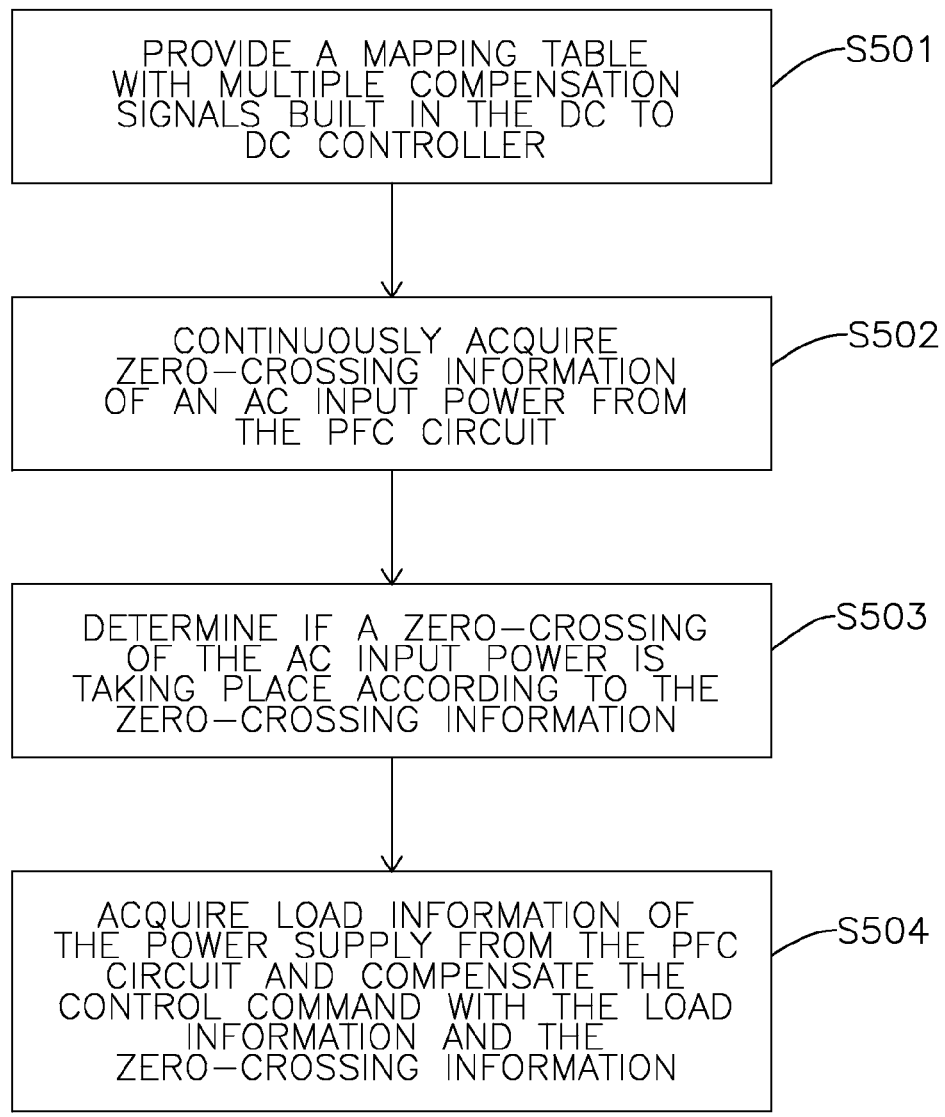
FIG. 5 is a flow diagram of a second embodiment of a method for compensating low-frequency output voltage ripple of the power supply in FIG. 1.
Figure 6:
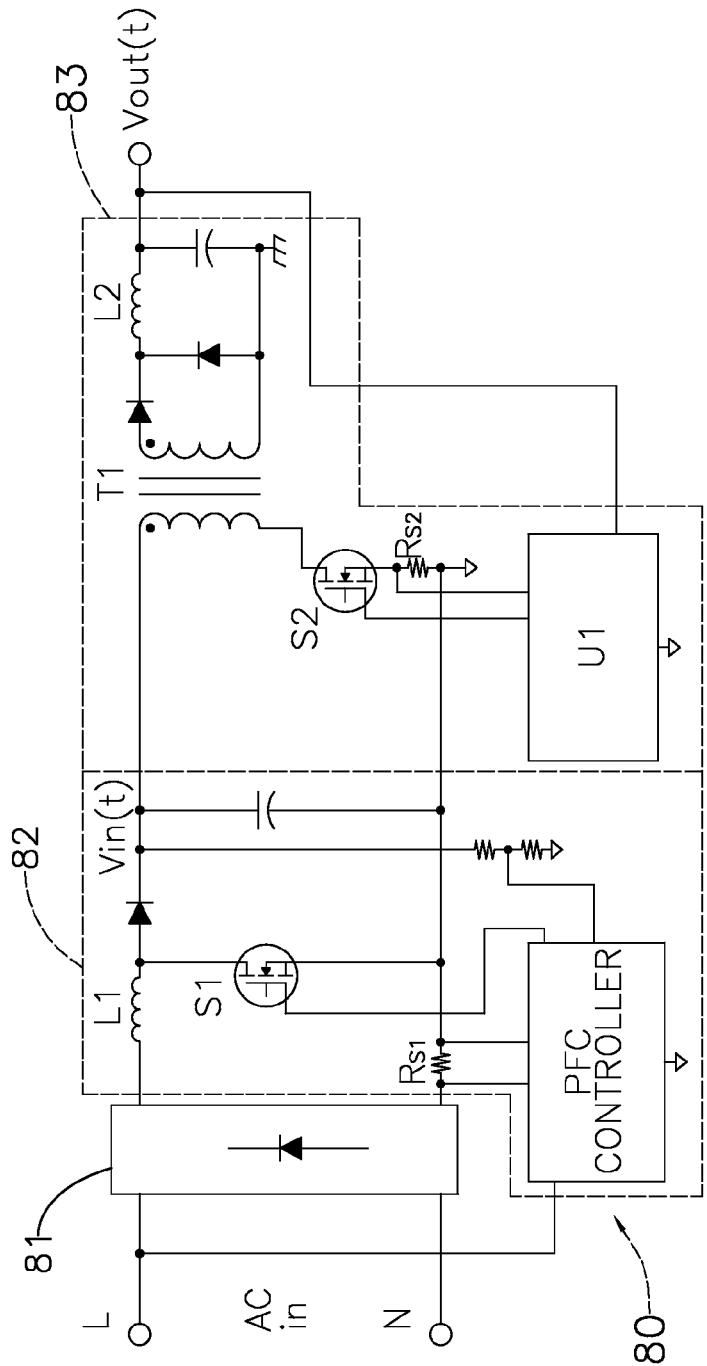
FIG. 6 is a circuit diagram of a conventional switching power supply.
Figure 7A:
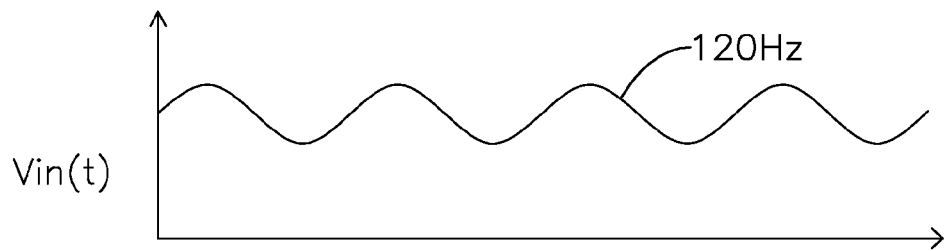
FIGS. 7A and 7B are waveform diagrams of input voltage and output voltage of a DC to DC conversion circuit of the switching power supply in FIG. 6.
Figure 7B:
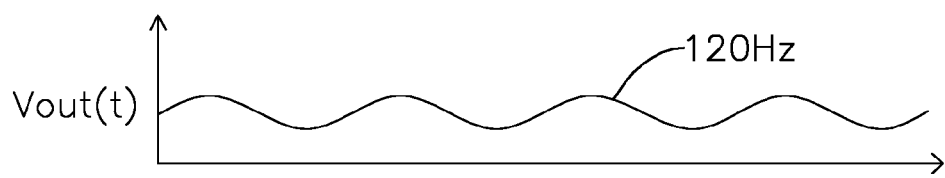
Figure 8:
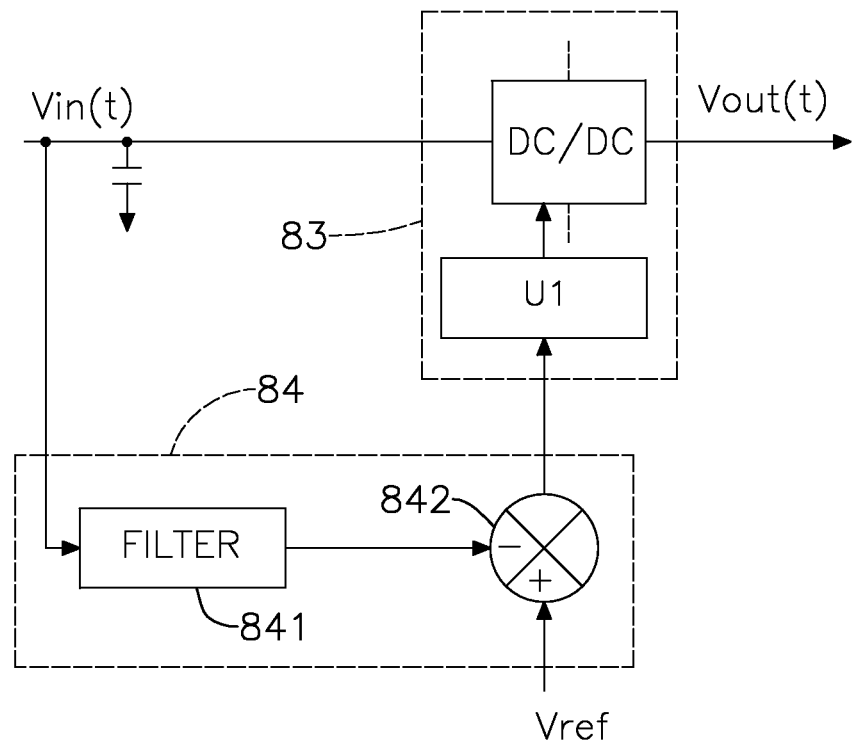
FIG. 8 is a functional circuit diagram of a conventional DC to DC conversion circuit with a low-frequency ripple compensation mechanism.

With reference to FIG. 5, a second embodiment of a method for compensating output voltage ripple of the foregoing power supply differs from the first embodiment in that Step S504 compensates the control command with the zero-crossing information and the load information acquired from the PFC circuit.

In sum, as the compensation technique adopted by the present invention involves no adjustment for the speed of low-frequency response of a controller, there is no concern for response characteristics of the power supply in the present invention varying with the low-frequency response. Also because the DC to DC controller of the DC to DC conversion circuit acquires the zero-crossing information of the AC input power from the PFC circuit and compensates the control command with a mapping table, no additional hardware circuit is required. Accordingly, circuit complexity and cost can be reduced.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for compensating low-frequency output voltage ripple of a power supply, wherein the power supply has a power factor correction (PFC) circuit and a DC (Direct Current) to DC conversion circuit, the DC to DC conversion circuit has a DC to DC controller performing the method, the method comprising steps of:
   providing a mapping table with multiple compensation signals built in the DC to DC controller;
   continuously acquiring zero-crossing information of an AC (Alternating Current) power from the PFC circuit;
   determining if a zero-crossing of the AC input power is taking place according to the zero-crossing information; and
   selecting a corresponding compensation signal from the mapping table to compensate a control command when the zero-crossing of the AC input power is taking place.

2. The method as claimed in claim 1, wherein the compensation signal is a part of a sinusoidal signal.

3. The method as claimed in claim 2, wherein phases of the compensated control signal and an input voltage of the DC to DC conversion circuit are reverse.

4. The method as claimed in claim 1, wherein in the step of selecting a corresponding compensation signal from the mapping table, the DC to DC controller further acquires load information of the power supply and compensates the control command with the load information and the zero-crossing information.

5. The method as claimed in claim 2, wherein in the step of selecting a corresponding compensation signal from the mapping table, the DC to DC controller further acquires load information of the power supply and compensates the control command with the load information and the zero-crossing information.

6. The method as claimed in claim 3, wherein in the step of selecting a corresponding compensation signal from the mapping table, the DC to DC controller further acquires load information of the power supply from the PFC circuit and compensates the control command with the load information and the zero-crossing information.

7. The method as claimed in claim 4, wherein the load information is acquired from the PFC circuit, and includes an input current of the PFC circuit.

8. The method as claimed in claim 5, wherein the load information is acquired from the PFC circuit, and includes an input current of the PFC circuit.

9. The method as claimed in claim 6, wherein the load information is acquired from the PFC circuit, and includes an input current of the PFC circuit.

10. The method as claimed in claim 4, wherein the load information is acquired from the PFC circuit, and includes an output current and an output voltage of the DC to DC conversion circuit.

11. The method as claimed in claim 5, wherein the load information is acquired from the PFC circuit, and includes an output current and an output voltage of the DC to DC conversion circuit.

12. The method as claimed in claim 6, wherein the load information is acquired from the PFC circuit, and includes an output current and an output voltage of the DC to DC conversion circuit.

13. A power supply, comprising:
a power factor correction (PFC) circuit having a PFC controller connected to an AC (Alternating Current) power to detect and provide zero-crossing information of the AC input power; and
a DC (Direct Current) to DC conversion circuit having a DC to DC controller connected to the PFC controller through a communication protocol to acquire the zero-crossing information of the AC input power, wherein the DC to DC controller has a control unit built in with a mapping table with multiple compensation signals, and the control unit locates one of the compensation signals from the mapping table to compensate an original control command according to the acquired zero-crossing information of the AC input power.

14. The power supply as claimed in claim 13, wherein the DC to DC controller is a pulse width modulation controller and further has:
a pulse width modulator; and
a first adder connected between an control command output terminal of the control unit and an input terminal of the pulse width modulator;
wherein the control unit of the DC to DC controller locates one of the compensation signals from the mapping table according to the zero-crossing information acquired from the PFC controller to compensate the original control command outputted from the control unit of the DC to DC controller to the pulse width modulator.

15. The power supply as claimed in claim 14, wherein the DC to DC controller further has a second adder adding a feedback output voltage of the DC to DC conversion circuit and a reference voltage and outputting a signal obtained from the addition to the control unit.

16. The power supply as claimed in claim 13, wherein
the DC to DC controller further has an adjustor connected between the mapping table and the first adder, and connected to and controlled by the control unit; and
the control unit controls the adjuster according to load information acquired from the PFC circuit to adjust a magnitude of the compensation signal selected from the mapping table and superimposed on the original control command.

17. The power supply as claimed in claim 14, wherein
the DC to DC controller further has an adjustor connected between the mapping table and the first adder, and connected to and controlled by the control unit; and
the control unit controls the adjuster according to load information acquired from the PFC circuit to adjust a magnitude of the compensation signal selected from the mapping table and superimposed on the original control command.

18. The power supply as claimed in claim 15, wherein
the DC to DC controller further has an adjustor connected between the mapping table and the first adder, and connected to and controlled by the control unit; and
the control unit controls the adjuster according to load information acquired from the PFC circuit to adjust a magnitude of the compensation signal selected from the mapping table and superimposed on the original control command.

* * * * *